W. BERNSTEIN.
TREAD.
APPLICATION FILED JULY 10, 1920.
1,389,025.
Patented Aug. 30, 1921.
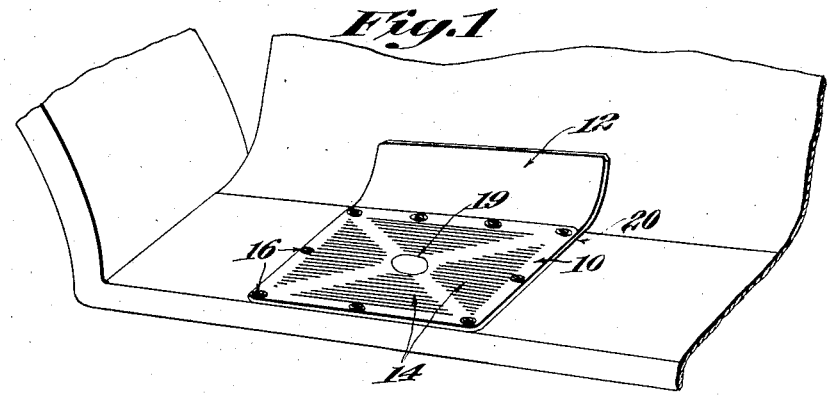
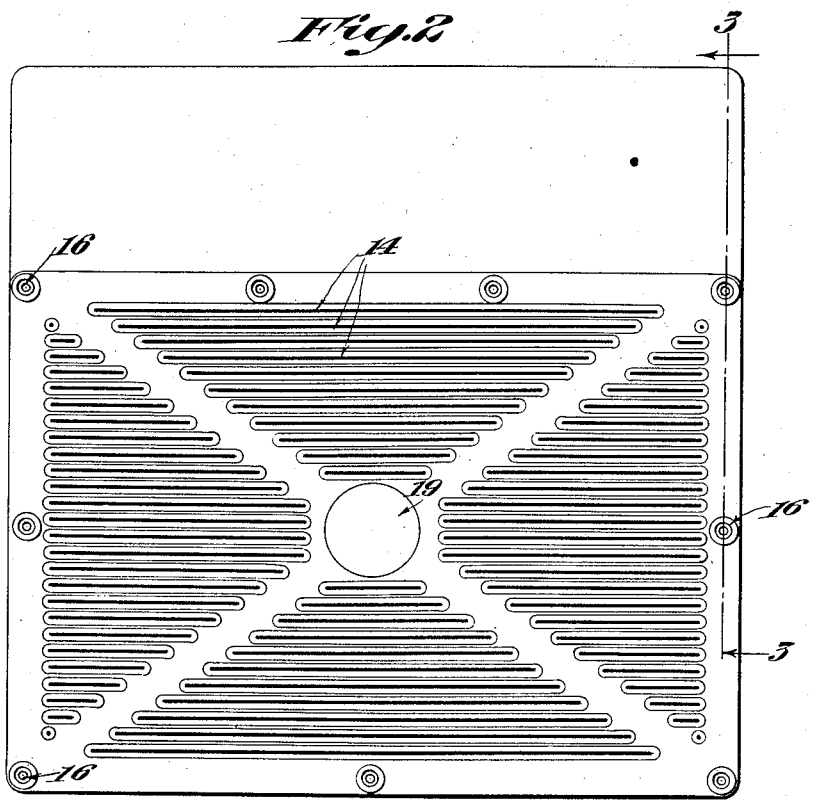
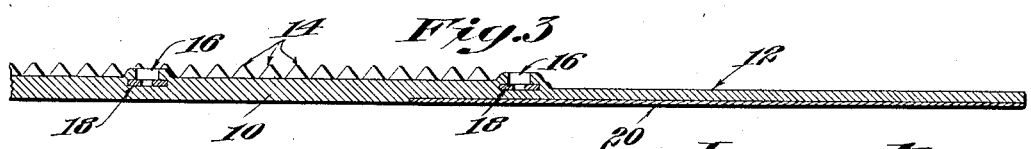

UNITED STATES PATENT OFFICE.

WILLIAM BERNSTEIN, OF JAMAICA PLAIN, MASSACHUSETTS, ASSIGNOR TO PANTHER RUBBER MANUFACTURING COMPANY, OF STOUGHTON, MASSACHUSETTS, A CORPORATION OF MASSACHUSETTS.

TREAD.

1,389,025.      Specification of Letters Patent.      Patented Aug. 30, 1921.

Application filed July 10, 1920. Serial No. 395,405.

*To all whom it may concern:*

Be it known that I, WILLIAM BERNSTEIN, a citizen of the United States, residing at Jamaica Plain, in the county of Suffolk and State of Massachusetts, have invented certain new and useful Improvements in Treads; and I do hereby declare the following to be a full, clear, and exact description of the invention, such as will enable others skilled in the art to which it appertains to make and use the same.

The present invention relates to certain improvements in tread members adapted for use in connection with automobiles or other vehicles.

The object of the invention is to provide a new and improved form of tread member adapted primarily for attachment upon the running board of a motor vehicle which is neat and attractive in appearance, and which serves the dual function of a scraper member to remove dirt from the foot and a protector or guard for the usual apron connecting the running board with the body of the motor vehicle.

With this object in view the feature of the invention consists in the provision of a single integral molded member of rubber or the like, having a body portion provided with the usual scraper ribs or projections, and adapted to be secured to the running board, and a flexible apron of uniform thickness extending therefrom and reinforced by a layer of fabric which extends over and is molded into the body portion to provide an additional reinforcement for holding the securing fasteners.

In the drawings illustrating the preferred form of the invention, Figure 1 is a perspective showing the tread in its operative position upon the running board of the motor vehicle with the guard member extended upwardly from the running board and resting upon the apron; Fig. 2 is a plan of the tread; and Fig. 3 is a section on line 3—3, Fig. 1.

The improved tread comprises a body or tread portion 10 and a guard member 12. Both the body portion 10 and the guard 12 are composed of rubber, rubber composition or the like and are molded in a single operation. The body portion 10 of the tread is provided with a series of projections 14 adapted to form a corrugated scraper surface so arranged with respect to one another that the accumulated dirt may be readily removed therefrom, and with a plurality of fastener receiving openings 16 arranged about the marginal portion of the body portion of the tread. A plurality of washers 18 are embedded within the openings 16 and are adapted to engage the heads of the fastening devices, to permit securely fastening the body portion of the tread to the running board or step of a motor vehicle. The guard 12 is of uniform thickness throughout and of less thickness than the body portion 10, and the width of the guard is sufficient to cover and protect that portion of the surface of the curved apron which is usually scarred or damaged by the occupants of the motor vehicle as they mount the running board or step. As indicated at 19 the tread portion may be provided with a removable plug upon which is printed the name or other designation of different dealers.

A reinforcing fabric 20 is embedded in the under surface of the guard 12 and is extended a short distance across and inset in the under surface of the body portion 10 of the tread. The fabric 20 is embedded in the under surface of the guard 12 and body portion 10 during the molding of the tread, in order to form a flush under surface of the finished tread. The fabric 20 serves to reinforce the guard 12 and the guard thus reinforced possesses the requisite resiliency and strength to cause it to conform permanently to the curved shape of the apron when the tread is secured in place upon the running board or step of the motor vehicle, as shown in Fig. 1. The fabric 20, it will be observed, is extended under the fastener receiving openings 16 along the edge of the body portion of the tread adjacent the guard 12, and operates to reinforce the tread at this point.

It will be obvious to those skilled in the art that it is essential in connection with articles of the above described character that the tread surface shall lie flat upon the running board, and that the guard member shall curve in conformity with the apron or other portion of the motor vehicle with which it contacts. In the present form of tread this result is attained, due to the use of a reinforced guard member which is of uniform thickness throughout, extending from the body portion of the tread. Furthermore, the use of the reinforcing fabric upon the bottom of the guard member extending across a part of the body portion has a further advantage in that it prevents a breaking or creasing of the guard member which might otherwise be accomplished by forcibly bending it. Obviously this is a considerable advantage as it enables the tread as a whole to retain its attractive and neat appearance during the entire time that it may be used.

While the improved tread has been described as composed of rubber or rubber composition, it will be understood that it may be composed of other plastic materials.

Having thus described the invention, what is claimed is:

A tread member for motor vehicles or the like comprising a single integral molded member having a tread portion provided with scraper projections, fastener receiving openings disposed about the margin of the tread portion, a flexible guard member extending from one side of the tread portion of substantially uniform thickness throughout, and of lesser thickness than the thickness of the tread portion, and a reinforcing layer of fabric molded on to the under side of the guard member and extending across and beneath the tread member and certain of the fastener receiving openings to assist in causing the guard member to permanently conform to the curvature of that portion of the motor vehicle with which it contacts and to reinforce those fastener receiving openings beneath which it extends.

WILLIAM BERNSTEIN.